United States Patent [19]

Stevenson

[11] 4,201,518
[45] May 6, 1980

[54] RECIRCULATING FLUID PUMP CONTROL SYSTEM

[76] Inventor: Alden Stevenson, 23448 N. Church Rd., Scottsdale, Ariz. 85255

[21] Appl. No.: 905,359

[22] Filed: May 12, 1978

[51] Int. Cl.² ............................................. F04B 49/06
[52] U.S. Cl. ........................................ 417/12; 417/32; 417/63
[58] Field of Search ........................ 417/12, 63, 32, 33

[56] References Cited

U.S. PATENT DOCUMENTS

| | | | |
|---|---|---|---|
| 1,426,206 | 8/1922 | Lybeck | 417/32 |
| 1,434,670 | 11/1922 | Beach | 417/33 X |
| 1,552,235 | 9/1925 | Russell | 417/12 |
| 1,780,379 | 11/1930 | Durdin | 126/362 |
| 2,628,995 | 2/1953 | Shanklin | 417/12 X |
| 3,383,495 | 5/1968 | Laube et al. | 126/362 X |
| 4,087,204 | 5/1978 | Niedermeyer | 417/63 X |

Primary Examiner—Carlton R. Croyle
Assistant Examiner—Edward Look
Attorney, Agent, or Firm—Lavalle D. Ptak

[57] ABSTRACT

A recirculating hot water system includes a hot water supply pipe and a hot water return pipe connected in a loop between a hot water outlet of a hot water tank and a return inlet to that tank. An electrically controlled recirculating pump is placed in the return pipe between the inlet to the hot water tank and the supply pipe which has hot water taps located at various points along it. Manually operated push buttons are located adjacent at least some of these hot water taps to operate a time delay circuit, which turns on the recirculating pump for a pre-established time interval determined by the parameters of the time delay circuit. Thus, the recirculating pump is turned on only when there is a demand for hot water circulating through the system. To prevent unnecessary operation of the pump, a thermostatically controlled switch may be coupled to the return pipe to override any signals from the time delay circuit and prevent the pump from operating if the water in the return pipe is at or above some minimum temperature determined by the setting of the thermostat.

9 Claims, 2 Drawing Figures

RECIRCULATING FLUID PUMP CONTROL SYSTEM

BACKGROUND OF THE INVENTION

Recirculating hot water systems are frequently used in hotels, motels and other large buildings where many hot water faucets or outlet taps are used at various locations throughout the buildings. In such systems, the hot water is supplied from the hot water tank or reservoir through a supply pipe to the hot water faucets and then is returned by way of a return pipe through a pump back to the hot water reservoir. The pump is operated to circulate water from the top or hot water side of the storage reservoir back to the bottom, so that hot water is continuously available throughout the length of the supply pipe. The result is the availability of "instant" hot water at any one of the faucets or taps throughout the system.

An alternative system for providing the availability of nearly instantaneous hot water at the hot water taps is to use a gravity system instead of a recirculating electrically controlled pump. In a gravity system, each hot water tap or faucet which is successively farther from the hot water reservoir is supplied from a supply line that is lower in height from the preceding faucet or tap in the system. The supply line from the last hot water tap in the system then is connected to a return line to supply the cooler water back to the hot water heater or reservoir. Natural gravity circulation takes place in such a system, because hot water rises and cold water sinks. An advantage of gravity systems is that the natural gravity circulation also is self-limiting after the entire line heats up.

Each of the recirculating hot water systems which have been described above and which are available in the prior art saves water which otherwise would be wasted by the user running hot water from a hot water faucet until the water leaving the faucet becomes hot. As a consequence, such systems are especially attractive in areas where water supplies must be carefully conserved. A disadvantage of recirculating hot water systems, however, is that even if the water supply pipes are well insulated, there is a substantial waste of energy to maintain the water throughout the system hot at all times. Because of the significantly increasing costs of energy over the past few years, the advantages of water savings in recirculating hot water systems are substantially offset by the energy wasted in maintaining the water throughout the system hot at all times. Furthermore, this wasted energy results in considerably increased costs for recirculating hot water systems, as compared with nonrecirculating systems; so that such recirculating systems have generally been limited to commercial uses, such as hotels and motels and have found only limited use in homes and individual residences.

In an effort to reduce the waste of energy and expense of operating recirculating hot water systems, heat sensing thermostats have been used to sense the water temperature in the return pipe and to control the turning on and off of the recirculating pump motor in accordance with the temperature sensed in the line. While this reduces the cost of the system somewhat, the inherent nature of such thermostatically controlled systems is that the temperature of the water in the pipes still is maintained at a fairly high level, so that the reduction in energy waste is not particularly significant. Such a system is disclosed in the prior art patent to Laube et al., U.S. Pat. No. 3,383,495, issued May 14, 1968.

A system which limits the operation of the recirculating pump of a recirculating hot water system to those times when instant hot water demands are most likely to occur is disclosed in the patent to Durdin, U.S. Pat. No. 1,780,379, issued Nov. 4, 1930. The Durdin system employs a timer to override the thermostatically controlled operation of the pump and prevent its operation during certain times of the day, such as during the night when there is little likelihood of demand for hot water in the system.

The Durdin system, however, has a gravity bypass in it; so that even though the electrically operated recirculating pump may be prevented from operation at certain times of the day, the recirculating system still operates under the gravity bypass principle. While some advantages may be present in the Durdin system, it clearly arbitrarily limits the operation of the pump in the system to the preset control of the timer. If this preset control does not coincide with the times of usage of the persons desiring to draw hot water from the system, the disadvantages of hot water systems which are not recirculating (that is relatively cold water in the line) may be present as if the recirculating system were not even used. In addition, if the gravity bypass part of the Durdin system is correctly installed, there would appear to be little need for the recirculating pump (except that it does speed up the distribution of hot water throughout the system); so that the wasted energy which occurs from constantly maintaining the line hot still is present in Durdin.

Another disadvantage of clock-controlled or time-controlled systems for operating the pump is that if a power failure should occur, the settings of the timer have to be readjusted or the system supplies hot water in the line at times other than the times intended.

Accordingly, it is desirable to provide a recirculating hot water system which has the advantages of providing nearly instantaneous hot water availability at the hot water taps or faucets when needed and yet which is more conservative of energy consumption than previous recirculating hot water systems. In addition, it is desirable to provide a recirculating hot water system which is simple to operate and simple to install.

SUMMARY OF THE INVENTION

It is an object of this invention to provide an improved recirculating fluid supply system.

It is a more specific object of this invention to provide an improved recirculating hot water system.

It is another object of this invention to provide an improved control system for a recirculating hot water system.

It is an additional object of this invention to provide an improved semi-automatic control system for a recirculating hot water system.

It is a further object of this invention to provide a recirculating hot water system with manually operated demand controls adjacent the various points of use of hot water in the system for operating the recirculating system upon demand of pre-established time intervals.

In accordance with a preferred embodiment of this invention, a fluid circulating system, particularly suited as a recirculating hot water system, includes a source of fluid or hot water with an outlet and an inlet. A supply pipe and a return pipe are interconnected in a loop between the outlet and inlet of the fluid supply source; and outlet taps or faucets are connected to the supply pipe to draw fluid from the system as desired. An electrically controlled pump is placed in the return pipe of the system between the outlet taps and the inlet to the fluid supply source. The pump is turned on for pre-established time intervals by a time delay switch connected in series between the pump and a source of electrical power for operating it. Manually controlled switches are located adjacent the different outlet taps or faucets for initiating operation of the time delay switch to cause the pump to operate to recirculate fluid in the system. The remainder of the time the pump is inoperative, so that recirculation is effected on demand when hot water is needed at one or more of the outlet taps or faucets in the system.

DETAILED DESCRIPTION OF THE PREFERRED EMBODIMENT

Figure 1:
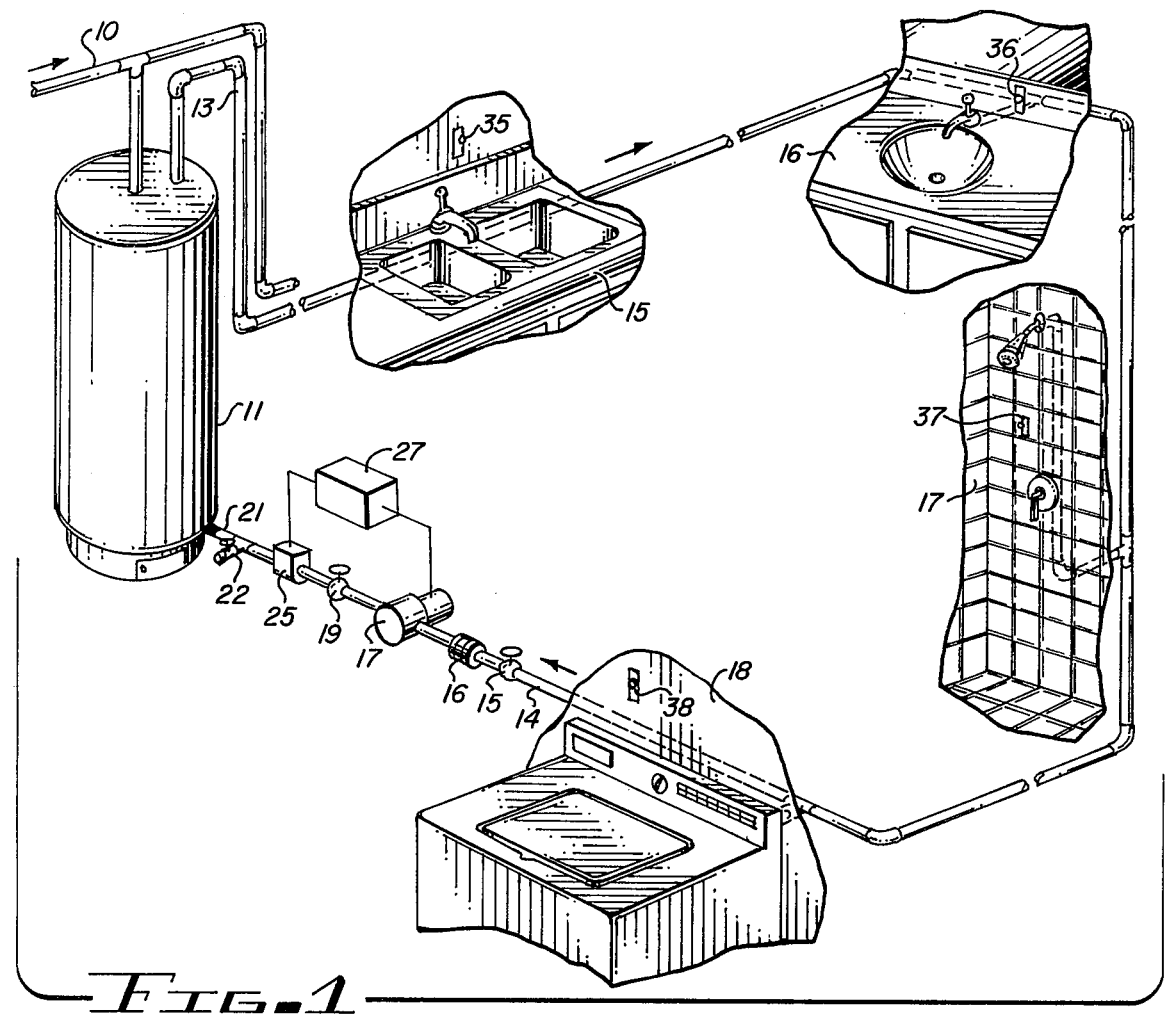
FIG. 1 is a diagrammatic representation of a typical installation of a preferred embodiment of the invention.
Figure 2:
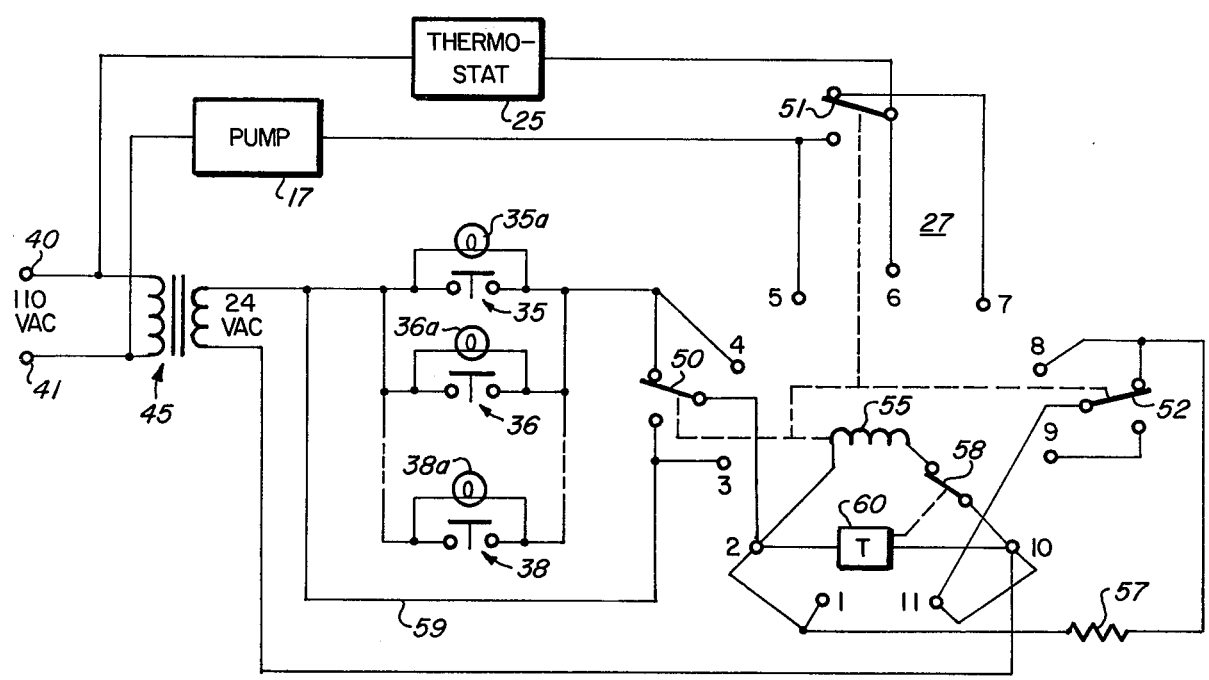
FIG. 2 is a schematic diagram of the control circuit used in conjunction with the system shown in FIG. 1.

Reference now should be made to FIGS. 1 and 2 of the drawing in which the same or similar reference numbers are used in both figures to designate the same components.

FIG. 1 is a diagrammatic representation of a recirculating hot water line in a home, hotel or other installation to which has been added a control system in accordance with the preferred embodiment of this invention. Cold water is supplied from a source (not shown) through a pipe 10 to a conventional hot water tank 11, from which hot water is drawn as needed through a hot water pipe 13 shown exiting from the top of the tank 11. The system shown in FIG. 1 is a recirculating system, so that the pipe 13 makes a loop through the house or hotel to deliver hot water to various hot water outlet taps or faucets connected to the pipe 13. These taps have been pictorially represented as including a kitchen sink faucet 15, a bathroom faucet 16, a shower 17, and a washing machine outlet faucet 18. In a nonrecirculating type of hot water system, the last faucet or tap on the line simply terminates the hot water pipe 13 and no return is made to the hot water tank 11. In the system shown in FIG. 1, however, a provision is made for recirculating hot water through the pipe 13 back to the tank 11; so that a return pipe 14 (which actually forms a noninterrupted continuation of the supply pipe) is shown extending beyond the washing machine 18, the last outlet tap or faucet in the system shown in FIG. 1, through a shut-off valve 15 and a check valve 16 to a recirculating pump 17.

The pump 17 may be any one of a number of different conventional small fractional horsepower electrically operated pump commonly used in recirculating hot water systems. The water passing through the pump 17 is supplied through a second shut-off valve 19 to a return fluid inlet 21 located at the bottom of the water heater 11. As illustrated in FIG. 1, a drain valve 22 is located at the inlet 21 to permit drainage of the water from the system for performing maintenance or when it is necessary to replace the hot water heater 11.

Also illustrated in FIG. 1 is a thermostatically controlled switch 25 which may be of various types to sense the temperature of the water passing through the return pipe 14 as it leaves the pump 17. The switch 25 is connected to a pump control circuit 27 and cooperates with the circuit 27 to control the turning on and turning off of the pump 17. The operation of the switch 25 and control circuit 27 is explained in detail subsequently in conjunction with FIG. 2.

Illustrated in each of the pictorial representations of the kitchen sink 15, bathroom sink 16, shower 17 and washing machine 18 are wall mounted push-button switches 35, 36, 37 and 38, respectively. These push-button switches are operated manually to supply signals to the control circuit 27 for turning on the pump 17 for preset time intervals on demand, whenever one of the switches 35 through 38 is depressed or operated. At all other times, the recirculating hot water system shown in FIG. 1 resembles a conventional nonrecirculating system since the pump 17 normally does not operate; and the check valve 16 prevents the withdrawal of water through the return pipe 14 from the bottom of the tank 11.

For example, assume that the pump 17 has been inoperative throughout the night. A user upon first arising in the morning then depresses the switch 36 or 37 located adjacent the sink or the shower in the bathroom to start the pump 17. The control circuit 27 operates to maintain operation of the pump 17 for a sufficient time interval (of the order of 4 or 5 minutes) to pull hot water into the entire supply pipe 13 throughout the house. "Instant" hot water then is available at any one of the outlet taps 15 through 18.

The time interval during which the pump 17 runs is pre-established and the user does not have to remember to turn the pump 17 off. It is turned off automatically at the end of the time interval. The thermostatically controlled switch 25 is provided to override any controls supplied to the control circuit 27 from the switches 35 through 38 in the event that the water in the line already is above some pre-established minimum temperature. This means that subsequent depressions of any one of the push-button switches 35 through 38 will not turn on the pump unless the water temperature in the return line 14 is below the minimum temperature to which the thermostat switch 25 has been set.

Reference now should be made to FIG. 2 which shows the details of the control circuit 27 used to control the turning on and turning off of the pump 17.

Operating power for the pump and the control circuit is shown in FIG. 2 as being supplied from a conventional 110 volt AC household supply applied across a pair of input terminals 40 and 41. One side of this supply is connected to the pump 17, and the other side is connected to the thermostat switch 25. In addition, the 110 volt AC supply applied to the terminals 40 and 41 is supplied to the primary winding of a step-down transformer 45, the secondary winding of which produces a 24 volt alternating current supply for the control circuit 27.

The heart of the control circuit 27 is a time delay relay which provides a preset time delay on drop-out following its initial actuation. The relay which is illustrated in FIG. 2 is shown as a conventional ARTISAN brand No. 429-3-D-1 relay which is commercially available from the Artisan Electronics Corporation. This relay may be factory set to a delay of up to 300 seconds after drop-out. It operates in response to the closure of a switch to move three sets of single-pole double-throw switches 50, 51 and 52 from the position shown in FIG.

2 (the upper position of each of these switches) to the lower contact set for each of the switches 50, 51 and 52. All of these switches are operated simultaneously by a relay coil 55.

Energization of the relay coil 55 is effected by closure of any one of the push buttons 35, 36, 37 or 38 which are shown connected in parallel with one another across one leg of the AC supply, which is connected through the upper terminal of the switch contact 50 to pin 1 of the relay, and internally from pin 1 through pin 2 to the coil 55. The other side of the coil 55 of the relay is connected through a normally closed switch contact 58 to pin 10 of the relay, which in turn is connected with the opposite side of the secondary winding of the transformer 45 to complete the operating circuit for the relay coil 55. It should be noted that in the normal unoperated state of the relay, as illustrated in FIG. 2, a set of lamp filaments 35A through 38A (each of which is connected across the respective ones of the push-button switches 35 through 38) are connected in series circuit (and in parallel with one another) with the relay coil 55. In addition, a resistor 57 is connected across pins 1 and 10 of the relay through the normally closed switch 52, so that this resistor also is in parallel with the relay coil 55 during the unoperated state of the relay. Because of the resistances of the lamp filaments 35A through 38A and of the resistor 57, insufficient current flows through the relay coil 55 to operate it and the circuit is in its standby or unoperated state.

Whenever any one of the push-button switches 35 through 38 is momentarily depressed, it effectively shunts or short circuits all of the lamp filaments 35A through 38A. Increased current then flows through the relay coil 55, causing the relay to operate. When this occurs, all of the switches 50, 51 and 52 are operated to close against the lower contacts of the switches. When the swinger of the switch 50 engages its lower contact, a holding path for the relay coil 55 is established by way of the shunt lead 59 connected to the lower contact of the switch 50. At the same time, operation of the switch 52 takes the resistor 57 out of the relay circuit; so that maximum current flows through the coil 55.

The shunt lead 59 maintains the shunt or short circuit of all of the push-button switches 35 through 38 and the lamp filaments 35A through 38A associated with each of these switches. As a consequence, the lamp filaments are turned off or dimmed, providing an indication at each location throughout the system that the pump 17 is activated to recirculate hot water through the system. Thus, additional depression of any one of the other push buttons 35 through 38 has no effect on the circuit since the shunt 59 provides the holding path for operating the relay.

In addition to providing operating current for the relay 55, the connections between pins 1 and 2 and pin 10 of the relay energize a timing circuit or timer device 60 which is set at the factory to the desired delay for the relay. As mentioned above, the particular relay which is depicted in FIG. 2 can be factory preset to provide a delay on drop-out of up to 300 seconds, which is generally sufficient for the operation of a recirculating hot water system used in a typical home installation. When the relay is operated, the time delay of the timer portion of the circuit 60 is initiated; and at the end of that time delay the switch 58 is momentarily opened. Opening of the switch 58 breaks the holding current through the relay coil 55, and it releases to return the circuit to the state shown in solid lines in FIG. 2, readying it for the next operation of any one of the push buttons 35 through 38. The value of the resistor 57 is selected to be small enough to prevent operation of the clock drive circuit 60 during the standby state of the system, but large enough to allow relay switching when any one of the push buttons 35 through 38 is depressed.

When the relay 55 operates to close the switch 51 to its lower contact, a series circuit is completed from the terminal 41 through the pump 17, the switch 51 and the thermostatically controlled switch 25 back to the terminal 40 of the AC power supply. Thus, if the switch 25 is closed at this time, the pump 17 is operated. The duration of time the pump 17 is operated depends upon the drop-out or time-out period of the operation of the relay 55. Upon termination of that operation, resulting in the opening of the switch 51 to the position shown in FIG. 2, the pump energizing circuit is broken and the pump 17 is turned off.

If the water temperature in the return line 15 reaches the desired minimum level set by the thermostatically controlled switch 25, the switch 25 is opened and the pump operation terminates irrespective of the operation of the relay 55. In this manner, maximum efficiency of operation of the system is realized with minimum energy waste.

Once the relay coil 55 is de-energized, and the contact 50 returns to its original position, as shown in FIG. 2, current once again flows through the filaments of the lamps 35A through 38A illuminating the lamps to indicate the users of the system that the pump 17 is turned off. This provides an extra indication to system users of the status of operation of both the control circuit 27 and the pump 17.

The push-button switches 35 and the lamp filaments 35A can be incorporated into a single unit, and ideally are the same type of switches which are commonly used for the illuminated push-button switches in widespread use as door bell buttons. Time delay relays other than the one specifically described in conjunction with FIG. 2 may also be used. Another approach is to use a thermal delay relay which, upon operation of the relay coil, also passes a heating current through or near a bimetallic strip. The strip then bends to open contacts after the pre-established time delay interval to break the holding path for the relay coil and terminate operation of the relay. In many applications, thermal delay relays are not considered appropriate since their time delay interval is somewhat dependent upon ambient temperature and therefore is not precise. For the type of system under consideration here, however, thermal delay relays are appropriate. This is especially true where, in most situations, if the ambient temperature rises the time required to heat up a hot water line should decrease. Thus, the use of a thermal delay having a negative temperature co-efficient of delay is appropriate for the system.

The system which has been described above constitutes a simple demand control (with thermostatic override) for the operation of a recirculating pump in a recirculating hot water system. The check valve 16 prevents reverse flow through the system, and the utilization of the low voltage wiring results in economies in installation. In addition, conventional door bell buttons and the low voltage relays, currently available on the market, can be employed for the operating components of the control circuit 27 in the system; and no custom designed components need to be used.

Variations of the system will occur to those skilled in the art after review of the preferred embodiment described above and shown in the drawings. The embodiment of FIGS. 1 and 2 of the drawing is merely shown for purposes of illustration and is not to be considered limiting of the true scope of the invention. Modifications which can be made to the system described could include a parallel clock-controlled pump power supply to activate the pump 17 at known times of hot water consumption in the particular installation in which the system is used. The addition of a ratcheting relay which, on successive pressings of a pump control button, would add up increments of the basic proposed 300 second interval may be advantagous to maintain the hottest water temperatures during some cycles of operation or times of day of use of the system.

Another alternative is to control the pump from settable time delay switches at one or more locations in the system. The predetermined time interval then can be adjusted at each such switch to fit the particular needs of the system and this time interval may be varied, if desired.

I claim:

1. A hot water circulating system including in combination:
    a source of hot water supply having an outlet and an inlet;
    a supply pipe and a return pipe interconnected in a loop between the outlet and the inlet, respectively, of said source of hot water supply;
    a plurality of outlet taps connected to said supply pipe;
    an electrically controlled pump means in said loop between the outlet and the inlet to said source of hot water supply;
    switch means connected in electrical circuit with said pump means for operating said pump means under control of operation of said switch means; and
    a plurality of manually operated control means, a different one of which is located adjacent each of said outlet taps for operating said switch means.

2. The combination according to claim 1 further including isolation valves located in said return pipe on opposite sides of said pump, said isolation valves being normally open to permit fluid to flow therethrough and through said pump and being closable to isolate said section of said return pipe including said pump from said supply pipe and from the inlet to said source of hot water supply.

3. The combination according to claim 1 wherein said pump means is in said return pipe between said outlet tap and the inlet to said source of hot water supply; and further including a check valve in said return pipe between said pump and said outlet tap to permit hot water to flow only from said supply pipe to said pump.

4. The combination according to claim 1 further including a thermostatically controlled switch coupled with said return pipe and connected in series with said switch means in said electrical circuit with said pump means to disable said pump means, irrespective of the operation of said switch means, whenever a predetermined temperature is sensed by said thermostatically controlled switch.

5. The combination according to claim 1 wherein said switch means comprises a time delay relay switch means energized to close an operating circuit to said pump means in response to operation of said manually operated control means, and a timing circuit means, whereby operation of said relay switch means closes a holding contact therefor to maintain said relay switch means operated through a normally closed switch operated by said timing circuit means, said normally closed switch being opened at the end of said pre-determined time interval by said timing means to de-energize said relay switch means and turn off said pump means.

6. The combination according to claim 1 wherein said switch means is a time delay switch means for operating said pump means for a predetermined time interval after operation of said switch means.

7. The combination according to claim 6 wherein said manually operated control means are electrically connected in parallel with one another between a source of supply voltage and said time delay switch means for operating said time delay switch means in response to operation of any one of said manually operated control means.

8. The combination according to claim 7 wherein said manually operated control means comprise push-button switch means.

9. The combination according to claim 8 further including visible indicia at each of said manually operated control means to indicate operation of said time delay switch means by any one of said manually operated control means.

* * * * *